UNITED STATES PATENT OFFICE.

BERNARD MOHR, OF LONDON, ENGLAND.

PROCESS OF TREATING SULFID ORE.

SPECIFICATION forming part of Letters Patent No. 588,076, dated August 10, 1897.

Application filed June 14, 1897. Serial No. 640,768. (No specimens.)

*To all whom it may concern:*

Be it known that I, BERNARD MOHR, a citizen of England, residing at No. 69ᴀ Parliament Hill, Hampstead, London, in the county of Middlesex, England, have invented a certain new and useful Treatment of Sulfid Ores for the Separation of Zinc from Lead and other Metals, of which the following is a specification.

This invention relates to the treatment of ores containing the sulfids of lead and zinc and of other metals with acid sulfate of sodium ($NaHSO_4$) in such manner that the zinc contained in these ores is converted into soluble sulfate of zinc, from which metallic zinc can be electrolytically deposited and the acid sodium sulfate can be recovered. For this purpose the pulverized ore and acid sodium sulfate, about ten to fifteen hundredweight per ton of ore, are fused together. The mass is then dissolved in hot water, to which, if necessary, a small quantity of sulfuric acid is added.

By a systematic lixiviation besides insoluble residue a concentrated solution of sodium sulfate is obtained containing more or less acid sodium sulfate and zinc sulfate. This solution is subjected to electrolysis until all or most of the zinc is deposited as metal and the sulfuric acid with which it was combined is set free. The liquid is then concentrated until it is of the strength necessary for being fused with a fresh batch of the sulfid ores, sufficient sulfuric acid being added to make up for loss. The insoluble residue of the solution in hot water, which consists of the sulfids of lead and of the other metals in the ore, is refined and desilverized according to well-known methods or otherwise utilized.

When the ore to be treated contains iron, it should first be calcined at a temperature of 400° to 500° centigrade, whereby the iron is brought into the form of an oxid which is insoluble in a solution of acid sodium sulfate. Then, instead of fusing the ore with the acid sodium sulfate, it is treated with a hot solution of the acid sodium sulfate, and thus there is obtained a solution of zinc sulfate and a mixture of neutral and acid sodium sulfate free from iron.

Any silver present in the solution may be precipitated by known means, and the zinc is then electrolytically deposited, as above described, setting free sulfuric acid which forms with the sodium sulfate fresh acid sodium sulfate applicable to the treatment of succeeding batches of ore.

The insoluble residue from the treatment with the acid sodium sulfate containing lead, iron, and other metals can be treated in any known way for refining and separating the metals.

Instead of acid sodium sulfate acid potassium sulfate may be employed in the same way.

Having thus described the nature of this invention and the best means I know of carrying the same into practical effect, I claim—

The herein-described process for treating sulfid ore by acting on the pulverized ore with acid sodium or potassium sulfate so as to obtain a solution of sulfate of zinc depositing the zinc by electrolysis and thus recovering the acid alkali sulfate, and treating the insoluble residue obtained by the lixiviation for recovery of the other metals.

In testimony whereof I have signed my name to this specification, in the presence of two subscribing witnesses, this 2d day of June, A. D. 1897.

BERNARD MOHR.

Witnesses:
 OLIVER IMRAY,
 JNO. P. M. MILLARD.